US008649889B2

(12) United States Patent
Cacciolo, Jr.

(10) Patent No.: US 8,649,889 B2
(45) Date of Patent: Feb. 11, 2014

(54) METHOD OF HOSTING AND MANAGING A TALENT COMPETITION THROUGH ONLINE, ONSTAGE, STUDIO, AND LIVE PERFORMANCES

(76) Inventor: Thino P Cacciolo, Jr., Freehold, NJ (US)

( * ) Notice: Subject to any disclaimer, the term of this patent is extended or adjusted under 35 U.S.C. 154(b) by 190 days.

(21) Appl. No.: 13/364,314

(22) Filed: Feb. 1, 2012

(65) Prior Publication Data

US 2012/0196268 A1 Aug. 2, 2012

Related U.S. Application Data

(60) Provisional application No. 61/438,335, filed on Feb. 1, 2011.

(51) Int. Cl.
*A63F 13/00* (2006.01)
(52) U.S. Cl.
USPC .............................................. 700/91; 463/42
(58) Field of Classification Search
USPC ..................................... 463/9, 40, 42; 700/91
See application file for complete search history.

(56) References Cited

U.S. PATENT DOCUMENTS

| 6,968,243 | B1 * | 11/2005 | Oh ................................... 700/91 |
| 2003/0069072 | A1 * | 4/2003 | Miura ............................. 463/42 |
| 2006/0292541 | A1 * | 12/2006 | Ehmann ........................ 434/350 |
| 2007/0244749 | A1 * | 10/2007 | Speiser et al. .................. 705/14 |
| 2008/0081695 | A1 * | 4/2008 | Patchen .......................... 463/40 |
| 2012/0123948 | A1 * | 5/2012 | Fefer et al. ..................... 705/301 |

* cited by examiner

*Primary Examiner* — James S McClellan
(74) *Attorney, Agent, or Firm* — Sinorica, LLC

(57) ABSTRACT

A method of hosting and managing a talent competition through online, onstage, studio, and live performances allows contestants to compete through a series of levels. The series of levels include a level-one, a level-two, a level-three, a level-four, and a grand finale. For level-one, the contestant submits a home video of their performance, which is voted on by the fans. For level-two, the contestant submits a onstage video of their performance, which is also voted on by the fans. For level-three and level-four, a professional will record the contestant's performance, which is again voted on by the fans. The grand finale will reveal which of the contestants won the grand prize. The method also allows judges to compete through an initial selection process, an intermediate selection process, and at the grand finale with the contestants. The grand finale will reveal which of the judges obtained the title of celebrity judge.

10 Claims, 10 Drawing Sheets

METHOD OF HOSTING AND MANAGING A TALENT COMPETITION THROUGH ONLINE, ONSTAGE, STUDIO, AND LIVE PERFORMANCES

The current application claims a priority to the U.S. Provisional Patent application Ser. No. 61/438,335 filed on Feb. 1, 2011.

FIELD OF THE INVENTION

The present invention generally relates to a business method for hosting a virtual/line talent competition. More specifically, the present invention provides users a medium to post videos of their talents being performed and provides a means for the general public, the fans, and the judges to vote for their favorite performer. The present invention also provides a means for the user to perform their talents online, onstage, in a studio, and live.

BACKGROUND OF THE INVENTION

Music and art are continuously evolving as an expression of life and the times. It defines generations and is all around us. Someone with the talent to create music and art deserves recognition from their peers and should be exposed to the general public. History has shown that someone with such talent can become a success story if they have a desire to be heard and a venue to share their talent. The present invention is a unique talent competition that creates a venue for contestants to share their talents.

The present invention takes the online talent competition to new and exciting levels. The present invention is the first online talent competition that starts in a friendly, artistic, and social network environment. The present invention then evolves into a series of onstage performances in local clubs around the country, where the contestant's friends, family, and fan base can support and encourage them as they cheer and cast their vote while the contestant struts their stuff across the stage. If the contestant advances to the next level, then the contestant will have the opportunity to work with professionals in the field of music and entertainment who will assist the contestant in taking their act to the next level. Unlike other online talent competitions, which are more popularity than talent competitions, the present invention levels the playing field. Submit your online performance, advance to level-two of the talent competition, and the contestant is given the opportunity to perform live at a local club or theater. If the contestant has what it takes and advances to the next level of competition, their musical act could be headed to a recording studio, where the contestant will be professionally recorded and videotaped. If you compete in the entertainment category, the contestant could have a professional interactive website built for the contestant to showcase their act. There are no unfair advantages or disadvantages; just honest head to head competition in every category. The journey could culminate at the grand finale, where the contestant could walk away with thousands in prize money.

DETAIL DESCRIPTIONS OF THE INVENTION

All illustrations of the drawings are for the purpose of describing selected versions of the present invention and are not intended to limit the scope of the present invention.

The present invention is a talent competition that utilizes online, onstage, and studio performances as a means to search for undiscovered talent. The present invention allows a plurality of contestants, a plurality of judges, and a plurality of fans to participate in the talent competition. The plurality of contestants is the group of people that want to showcase their talent through the present invention. The plurality of judges is the group of people that want to critique the talents of the contestants through the present invention. The plurality of fans is the group of people that want to support and encourage the contestants and the judges through the present invention. The primary means for the contestants, the judges, and the fans to access the present invention is a website software, which allows the administrators to manage a majority of the talent competition through the Internet.

Figure 1:
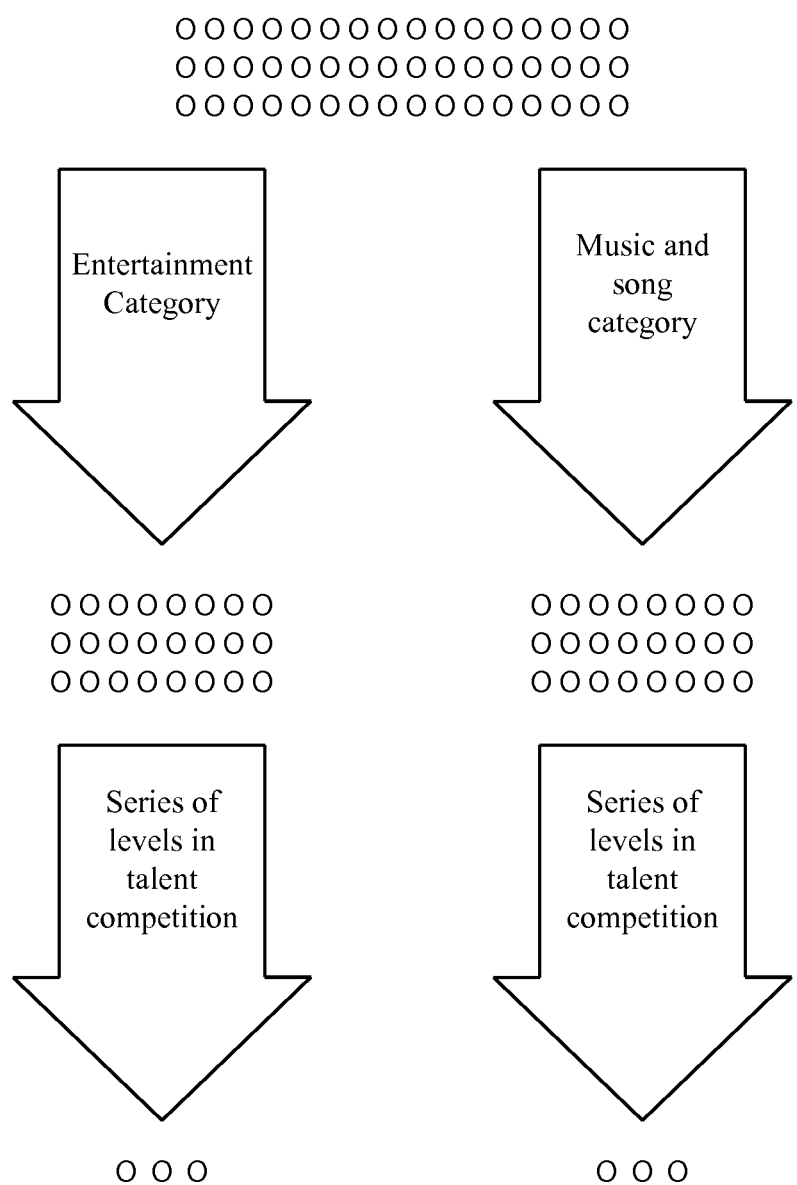
FIG. 1 is a flow chart showing how the contestants are divided and reduced through the progression of the talent competition, where the "O's" are the contestants.
Figure 2:
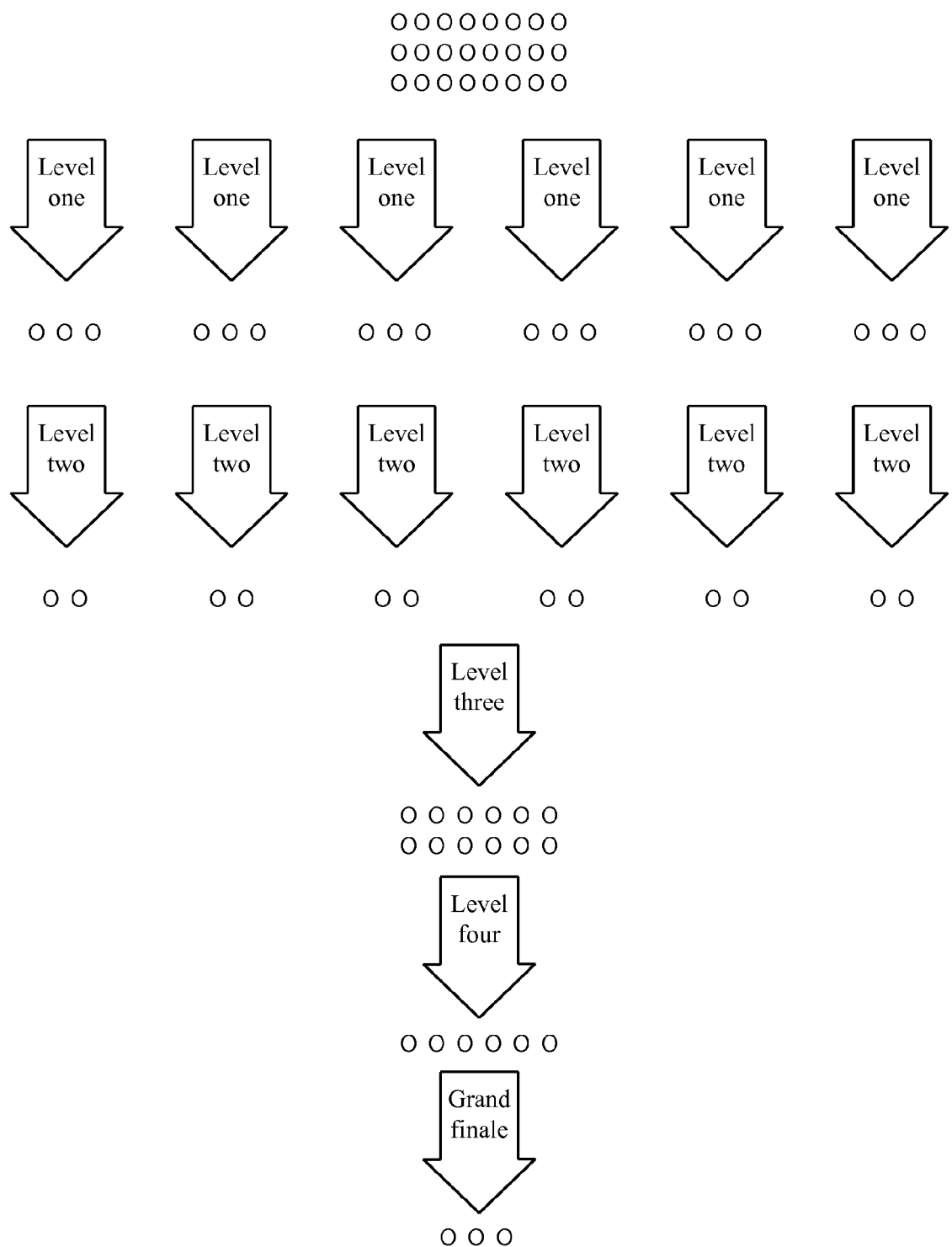
FIG. 2 is a flow chart showing how the contestants are reduced through the progression of the series of levels, where the "O's" are the contestants.

The present invention follows a process to search for undiscovered talent, which is shown in FIG. 1 and FIG. 2. The process begins by allowing each contestant, each judge, and each fan to create an online account on the website software. The online account is used to access a variety of functions on the website software and allows each contestant, each judge, and each fan to take part in the online portions of the talent competition. If a fan chooses not to create an online account, then the website software still allows the fan to participate in the voting portions of the talent competition, which means anyone in the general public can visit the website software and participate in voting portions of the talent competition. For the plurality of contestants, the process continues by choosing to take part in the music-and-song category or the entertainment category. The music-and-song category is for contestants that want to showcase their musical abilities and is geared more towards bands or musical groups and musical or vocal soloists. The entertainment category is for contestants that want to showcase their non-musical talents and is geared more towards comedians, magicians, rappers, dancers, tappers, jugglers, and etc. The plurality of contestants will then attempt to advance through a series of levels within the talent competition. The contestants within the music-and-song category will compete against each other to advance through the series of levels, and the contestants within the entertainment category will compete against each other to advance through the series of levels. The method in which the contestants advance through the series of levels is the same for both the music-and-song category and the entertainment category, but the tasks within each individual level may depend on whether a contestant chose to be in the music-and-song category or to be in the entertainment category. The series of levels within the talent competition include a level-one, a level-two, a level-three, a level-four, and a grand finale. Only contestants that qualify from the previous level of the talent competition can partake in the current level of the talent competition. For example, level-two qualifiers can participate in level-two to become level-three qualifiers and, thus, participate in level-three. The plurality of contestants automatically starts off as level-one qualifiers because there is no previous level of competition. The series of levels starts with level-one, which is reiterated through a six month period. Level-two is reiterated during the same six month period, but each reiteration of level-one is followed by an reiteration of level-two. The series of levels continues with level-three and level-four after the six month period and ends with the grand finale during the summer months.

Figure 3:
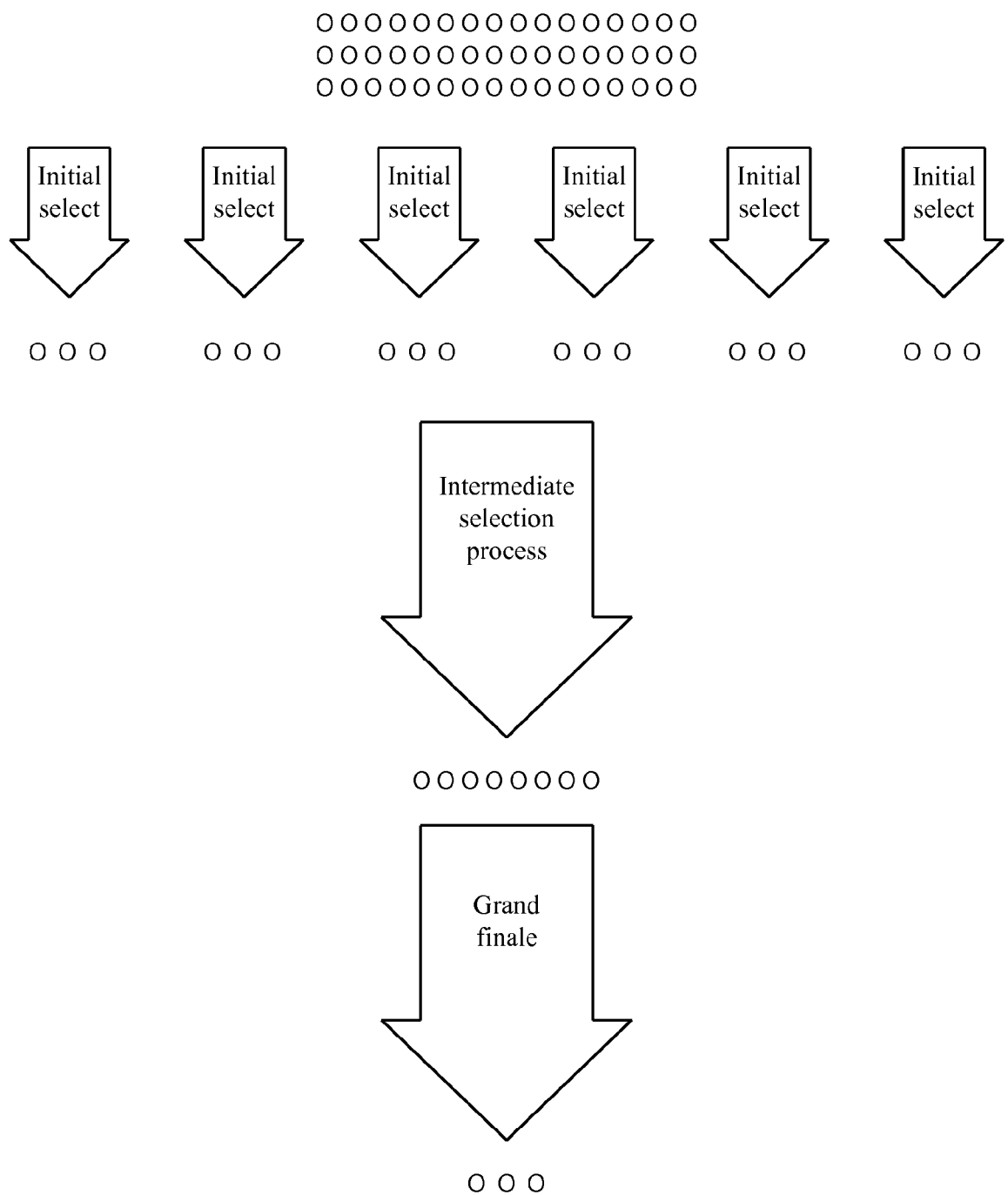
FIG. 3 is a flow chart showing how the judges are reduced through the progression of the talent competition, where the "O's" are the judges.

As can be seen in FIG. 3, the plurality of judges will advance through a series of selection processes to advance through the talent competition. The series of selection processes include the initial selection process and an intermediate selection process. The initial selection process allows novice judges to become veteran judges. Novice judges are judges with the lowest amount of experience. A novice judge will participate in the initial selection process to become a judge with more experience or a veteran judge. A veteran judge will participate in the intermediate selection process to become a judge finalist. Judge finalists participate with the final level qualifiers in the grand finale in order to obtain the title of celebrity judge. The plurality of judges will advance through the series of selection processes at the same time that the plurality of contestants is advancing through the series of levels within the talent competition. More specifically, the initial selection process will be concurrent with level-one and level-two, and the intermediate selection process will be concurrent with level-one, level-two, level-three, and level-four.

Figure 4:
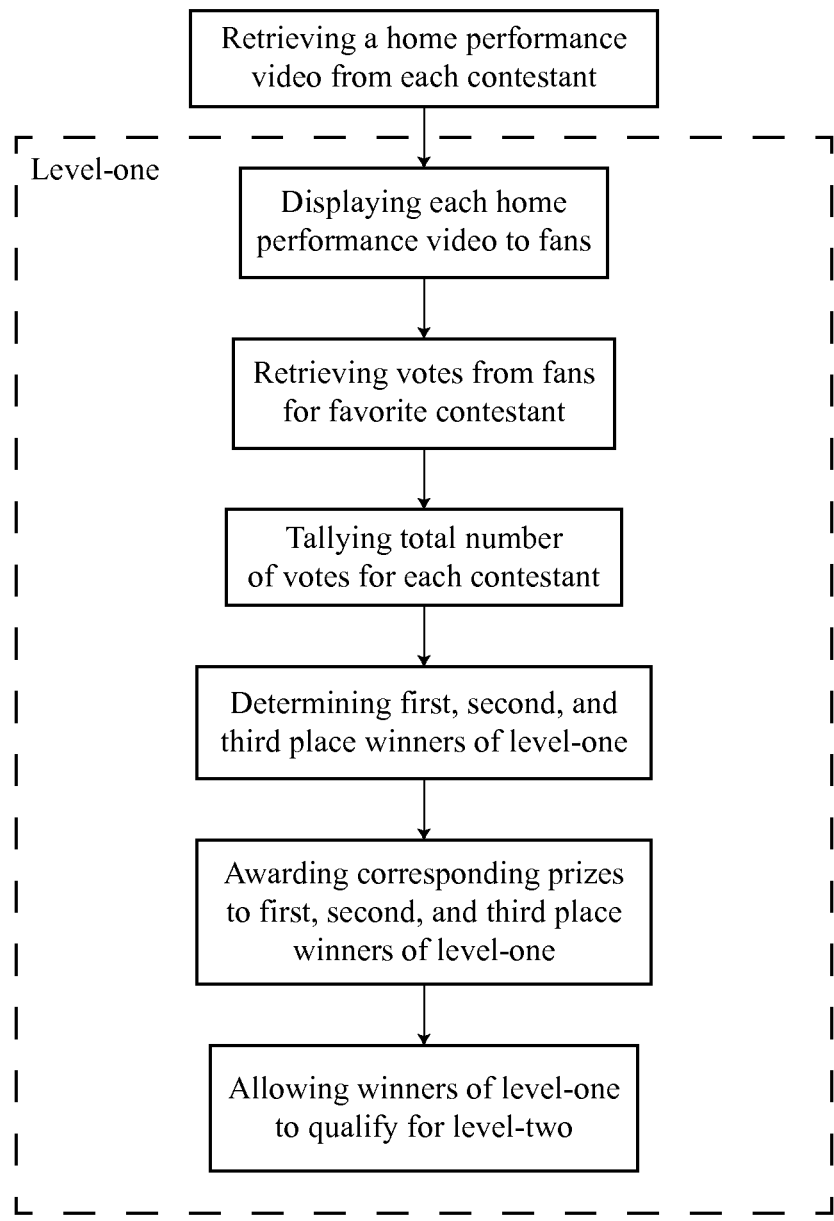
FIG. 4 is a generalized flow chart depicting the details of level-one for the contestants.

Level-one of the talent competition allows all of the contestants to participate as level-one qualifiers. Level-one shown in FIG. 4 is the same process for both contestants in the music-and-song category and contestants in the entertainment category. Before beginning level-one, the first level qualifiers are required to upload a home performance video to the website software. The home performance video is an audiovisual recording of the contestant performing their talent, which can be made with a household recording device such as a camcorder or a webcam. Level-one begins by determining if the home performance video from each first level qualifier is acceptable to be viewed by the plurality of fans. The administrator should check each home performance video against a list of approved songs, which is provided to the plurality of contestants prior to submitting their home performance video. The home performance video can have music that is not on the list of approved songs, but the administrator must approve the music on the home performance video. When each home performance video is deemed acceptable by the administrator, the website software displays the home performance video of each level-one qualifier to the plurality of fans. The website software allows each fan to cast a best level-one vote for their favorite level-one qualifier. The website software retrieves all of the best level-one votes from the plurality of fans for a month long session. For level-one, each Internet Protocol (IP) address that a fan uses to access the website software is restricted from casting more than three votes per contestant during the month long session and from casting more than one vote per contestant in a day during the month long session.

Next, a total number of best level-one votes is tallied for each level-one qualifier by the website software, which allows the administrator to determine a first place level-one qualifier, a second place level-one qualifier, a third place level-one qualifier, and a runner-up level-one qualifier. The first place level-one qualifier, the second place level-one qualifier, the third place level-one qualifier, and the runner-up level-one qualifier are determined by their respective total number of best level-one votes so that the first place level-one qualifier has the largest total number of votes and the runner-up level-one qualifier has the fourth largest total number of votes. The winners of level-one are then awarded with corresponding level-one prizes, which includes a $100 prize for first place, $50 prize for second place, and a $25 prize for third place. The runner-up level-one qualifier does not receive a prize. Level-one of the talent competition proceeds by prompting the first place level-one qualifier, the second place level-one qualifier, and the third place level-one qualifier to become level-two qualifiers, which allows the winners of level-one to participate in level-two of the talent competition. If the first place level-one qualifier, the second place level-one qualifier, or the third place level-one qualifier declines to join the level-two qualifiers, then the runner-up level-one qualifier is prompted to become a level-two qualifier. Finally, the remaining level-one qualifiers are prompted to replace their home performance video on the website software with a new home performance video. The new home performance video is shown in the following reiteration of level-one, which allows each level-one qualifier to better represent themselves to the plurality of fans and become a level-two qualifier.

Figure 5:
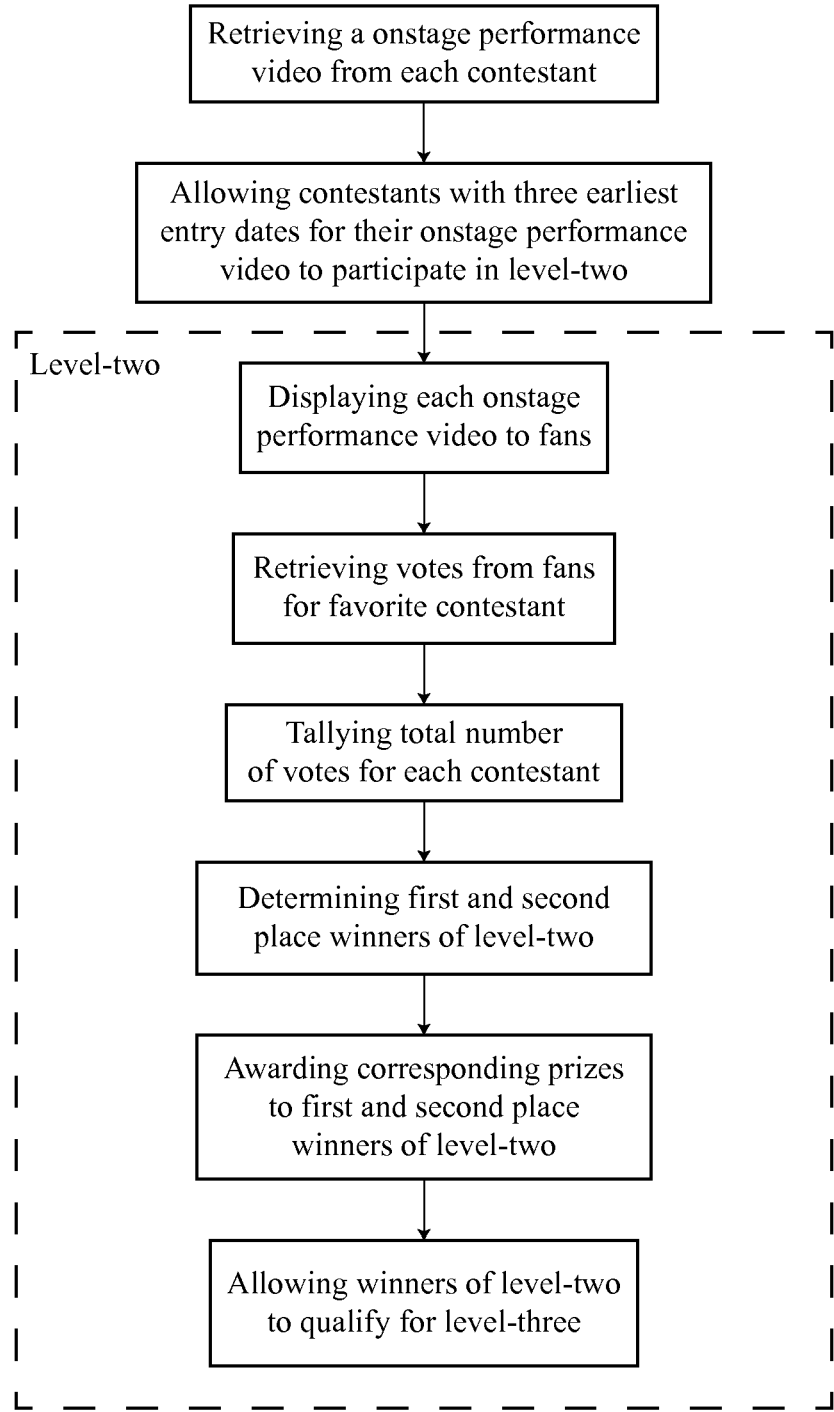
FIG. 5 is a generalized flow chart depicting the details of level-two for the contestants.

Level-two of the talent competition only allows the contestants to participate if they are level-two qualifiers. Level-two shown in FIG. 5 is the same process for contestants in the music-and-song category and the contestants in the entertainment category. Before beginning level-two, the second level qualifiers are required to upload an onstage performance video to the website software. The onstage performance video is an audiovisual recording of the contestant performing their talent at a local venue, such as a bar, a restaurant, a club, or a theater. The onstage performance video is uploaded by the website software with an entry date. When level-two begins, the entry date of each onstage performance video will be used to determine which of the level-two qualifiers will be active during the current reiteration of level-two. Thus, the active level-two qualifiers are the level-two qualifiers with the three earliest entry dates for their onstage performance video. The level-two continues by determining if the onstage performance video for each active level-two qualifier is acceptable to be viewed by the plurality of fans. The administrator checks each onstage performance video in the same way the administrator checks each home performance video in level-one of the talent competition. When each onstage performance video is deemed acceptable by the administrator, the website software displays the onstage performance video of each active level-two qualifier to the plurality of fans through the website software. The website software then allows each fan to cast a best level-two vote for their favorite level-two qualifier. The website software retrieves all of the best level-two votes from the plurality of fans for a month long session. For level-two, each IP address that a fan uses to access the website software is restricted from casting more than one vote per contestant in a day during the month long session.

Similar to level-one, a total number of best level-two votes is tallied for each active level-two qualifier by the website software, which allows the administrator to determine a first place level-two qualifier, a second place level-two qualifier, and a runner-up level-two qualifier. The first place level-two qualifier, the second place level-two qualifier, and the runner-up level-two qualifier are determined by their respective total number of best level-two votes so that the first place level-two qualifier has the largest total number of votes and the runner-up level-two qualifier has the third largest total number of votes. The winners of level-two are then awarded with corresponding level-two prizes, which includes a $100 prize for first place and $50 prize for second place. The runner-up level-two qualifier does not receive a prize. Level-two of the talent competition proceeds by prompting the first place level-two qualifier and the second place level-one qualifier to become level-three qualifiers, which allows the winners of level-two to participate in the level-three of the talent competition. If the first place level-two qualifier or the second place level-two qualifier declines to join the level-three qualifiers, then the runner-up level-two qualifier is prompted to become a level-three qualifier.

Figure 6:
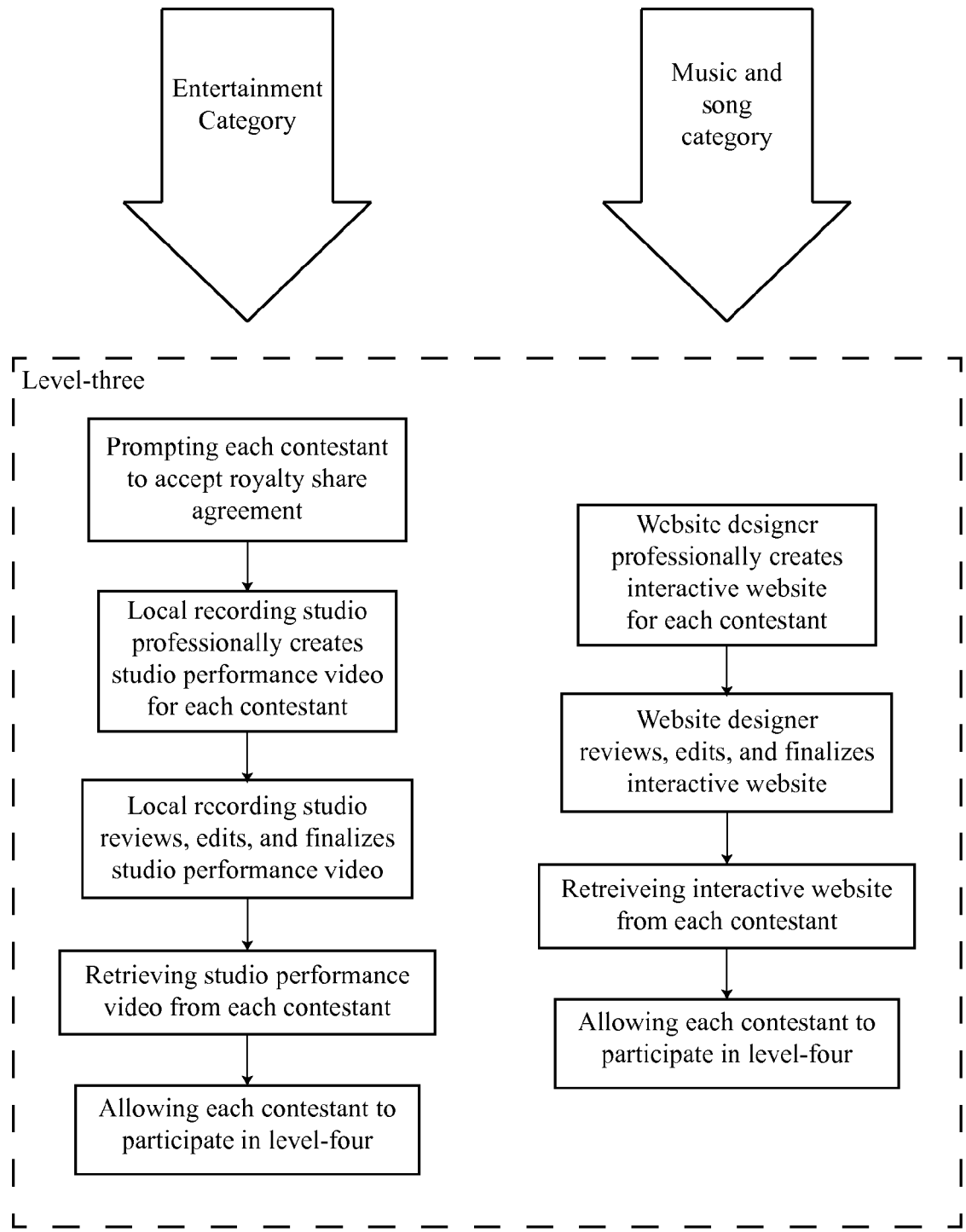
FIG. 6 is a generalized flow chart depicting the details of level-three for the contestants.

Level-three of the talent competition only allows the contestants to participate if they are level-three qualifiers. Level-three shown in FIG. 6 is a different process for the contestants in the music-and-song category than the contestants in the entertainment category. For the contestants in the music-and-song category, the level-three begins by prompting each level-three qualifier to accept a royalty share agreement. Once the royalty share agreement is accepted by each level-three qualifier, the administrator will invite each level-three qualifier to a local recording studio, where each level-three qualifier can professionally record a studio performance video. The studio performance video is an audiovisual recording of the contestant performing their musical talent in an optimal acoustic setting. The studio performance video is reviewed, edited, and finalized by the local recording studio so that the overall quality of the studio performance video is better than the quality of either the home performance video or the onstage performance video. Each level-three qualifier should upload their studio performance video to the website software when the studio performance video is completed by the local recording studio. Once the website software retrieves the studio performance video, each level-three qualifier is prompted to join the level-four qualifiers and, thus, participate in level-four of the talent competition. The administrator then determines if the studio performance video is acceptable to be viewed by the plurality of fans. If the administrator deems the studio performance video to be acceptable, then the studio performance video is displayed to the plurality of fans through the website software.

For the contestants in the entertainment category, level-three begins by prompting each level-three qualifier to communicate with a website designer that will professionally build an interactive website for them. The interactive website allows a level-three qualifier to upload and display additional videos of the contestant performing their talent. The interactive website is reviewed, edited, and finalized by the website designer. Each level-three qualifier can post their interactive website through the website software when the interactive website is completed by the website designer. Once the website software posts their interactive website, each level-three qualifier is prompted to join the level-four qualifiers and, thus, participate in the level-four of the competition. The administrator then determines if the interactive website is acceptable to be viewed by the plurality of fans. If the administrator deems the interactive website to be acceptable, then the interactive website is displayed to the plurality of fans through the website software.

Figure 7:
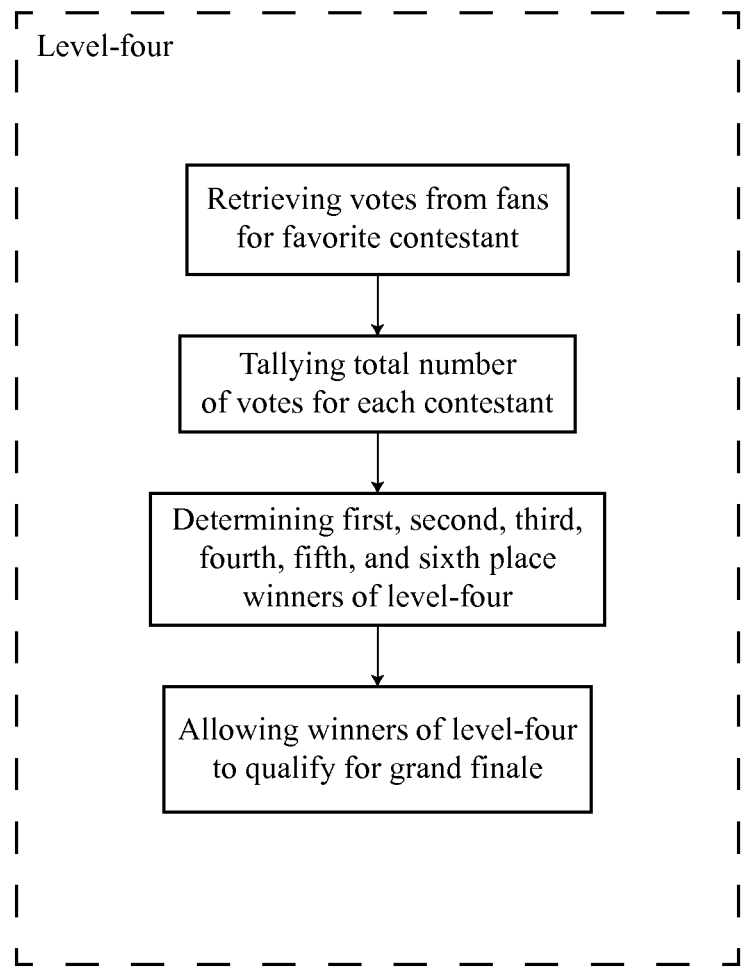
FIG. 7 is a generalized flow chart depicting the details of level-four for the contestants.

Level-four of the talent competition only allows the contestants to participate if they are level-four qualifiers. Level-four shown in FIG. 7 is the same process for contestants in the music-and-song category and for contestants in the entertainment category. Level-four follows a similar voting process to those found in level-two of the talent competition. Level-four begins by either displaying either the studio production video or the interactive website through website software to the plurality of fans. The website software allows each fan and each judge to cast a best level-four vote for their favorite level-four qualifier. The website software retrieves all of the best level-four votes from the plurality of fans for a month long session. For level-four, each IP address that a fan uses to access the website software is restricted from casting more than one vote per contestant in a day during the month long session.

Similar to level-two, a total number of best level-four votes is tallied for each level-four qualifier by the website software, which allows the administrator to determine a first place level-four qualifier, a second place level-four qualifier, a third place level-four qualifier, a fourth place level-four qualifier, a fifth place level-four qualifier, a sixth place level-four qualifier, and a runner-up level-four qualifier in both the music-and-song category and the entertainment category. The first place level-four qualifier, the second place level-four qualifier, the third place level-four qualifier, the fourth place level-four qualifier, the fifth place level-four qualifier, the sixth place level-four qualifier, and the runner-up level-four qualifier are determined by their respective total number of best level-four votes so that the first place level-four qualifier has the largest total number of votes and the runner-up level-four qualifier has the seventh largest total number of votes. The winners of level-four are not awarded any prizes during level-four. Level-four of the talent competition proceeds by prompting the first place level-four qualifier, the second place level-four qualifier, the third place level-four qualifier, the fourth place level-four qualifier, the fifth place level-four qualifier, the sixth place level-four qualifier to become final level qualifiers, which allows the winners of level-four to participate in the grand finale of the talent competition. If the first place level-four qualifier, the second place level-four qualifier, the third place level-four qualifier, the fourth place level-four qualifier, the fifth place level-four qualifier, or the sixth place level-four qualifier declines to join the final level qualifiers, then the runner-up level-four qualifier is prompted to become a final level qualifier. Lastly, the final level qualifiers are then invited to attend the grand finale.

Figure 8:
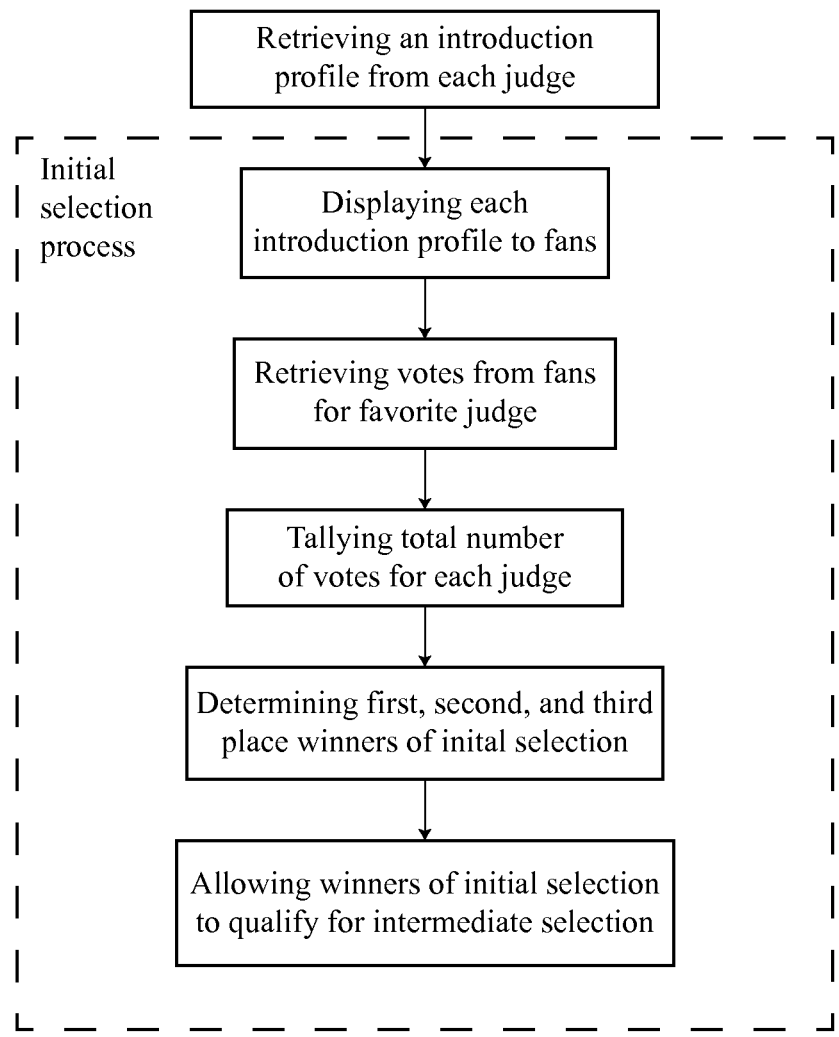
FIG. 8 is a generalized flow chart depicting the details of initial selection process for the judges.

As can be seen FIG. 8, the initial selection process allows all of the judges to participate as novice judges. Before beginning the initial selection process, the novice judges are required to upload an introduction profile to the website software. The introduction profile can either be a video or an audio track with a profile picture, which explain why he/she would make a good judge for the talent competition. The introduction profile should be a single track with no background music and should only be one to three minutes long. The initial selection process begins by displaying the introduction profile of each novice judge to the plurality of fans through the website software. The website software allows each fan to cast a best novice judge vote for their favorite novice judge. The website software retrieves all of the best novice judge votes from the plurality of fans for a month long session. For the initial selection process, each Internet Protocol (IP) address that a fan uses to access the website software is restricted from casting more than three votes per judge during the month long session and from casting more than one vote per judge in a day during the month long session.

Subsequently, a total number of best novice judge votes is tallied for each novice judge by the website software, which allows the administrator to determine a first place novice judge, a second place novice judge, a third place novice judge, and a runner-up novice judge. The first place novice judge, the second place novice judge, the third place novice judge, and the runner-up novice judge are determined by their respective total number of best novice judge votes so that the first place novice judge has the largest total number of votes and the runner-up novice judge has the fourth largest total number of votes. The winners of the initial selection process do not receive any prizes. The initial selection process continues by prompting the first place novice judge, the second place novice judge, and the third place novice judge to become veteran judges, which allows the winners of the initial selection process to participate in the intermediate selection process. If the first place novice judge, the second place novice judge, or the third place novice judge declines to join the veteran judges, then the runner-up novice judge is prompted to become a veteran judge. Finally, the remaining novice judges are prompted to replace their introduction profile on the website software with a new introduction profile. The new introduction video is shown in the following reiteration of the initial selection process, which allows each novice judge to better represent themselves to the plurality of fans and become a veteran judge.

Figure 9:
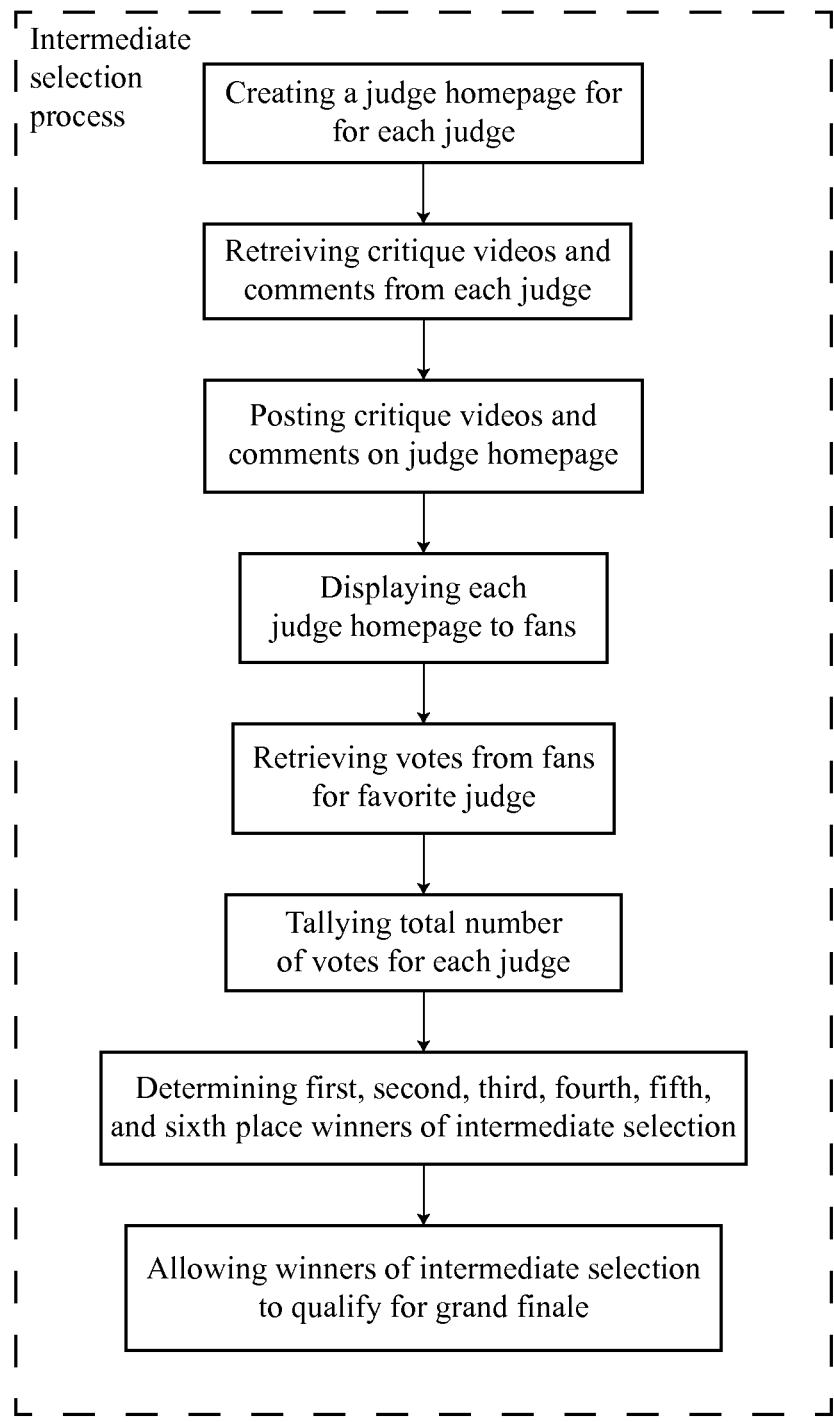
FIG. 9 is a generalized flow chart depicting the details of intermediate selection process for the judges.

As can be seen in FIG. 9, the intermediate selection process only allows the judges to participate if they are veteran judges. The intermediate selection process begins by creating a judge homepage for each veteran judge on the website software, which is used by the veteran judge to post critique videos and post comments. The critique videos are audiovisual recordings of the veteran judge reviewing a home performance video, an onstage performance video, or a studio production video for a contestant. The critique videos and the comments of each veteran judge is then displayed on their judge homepage to the plurality of fans through the website software. The website software allows each fan to cast a best veteran judge vote for their favorite veteran judge. The website software retrieves all of the best veteran judge votes from the plurality of fans for a month long session. For the intermediate selection process, each IP address that a fan uses to access the website software is also restricted from casting more than one vote per judge in a day during the month long session.

Next, the total number of best veteran judge votes is tallied for each veteran judge by the website software, which allows the administrator to determine a first place veteran judge, a second place veteran judge, a third place veteran judge, a fourth place veteran judge, a fifth place veteran judge, a sixth place veteran judge, and a runner-up veteran judge. The first place veteran judge, the second place veteran judge, the third place veteran judge, the fourth place veteran judge, the fifth place veteran judge, the sixth place veteran judge, and the runner-up veteran judge are determined by their respective total number of best veteran judge votes so that the first place veteran judge has the largest total number of votes and the runner-up veteran judge has the fourth largest total number of votes. The winners of the intermediate selection process do not receive any prizes during the intermediate selection process. The intermediate selection process continues by prompting the first place veteran judge, the second place veteran judge, the third place veteran judge, the fourth place veteran judge, the fifth place veteran judge, and the sixth place veteran judge to become judge finalists, which allows the winners of the intermediate selection process to participate in the grand finale of the talent competition. If the first place veteran judge, the second place veteran judge, the third place veteran judge, the fourth place veteran judge, the fifth place veteran judge, or the sixth place veteran judge declines to join the judge finalists, then the runner-up veteran judge is prompted to become a judge finalist. Lastly, the judge finalists are then invited to attend the grand finale.

Figure 10:
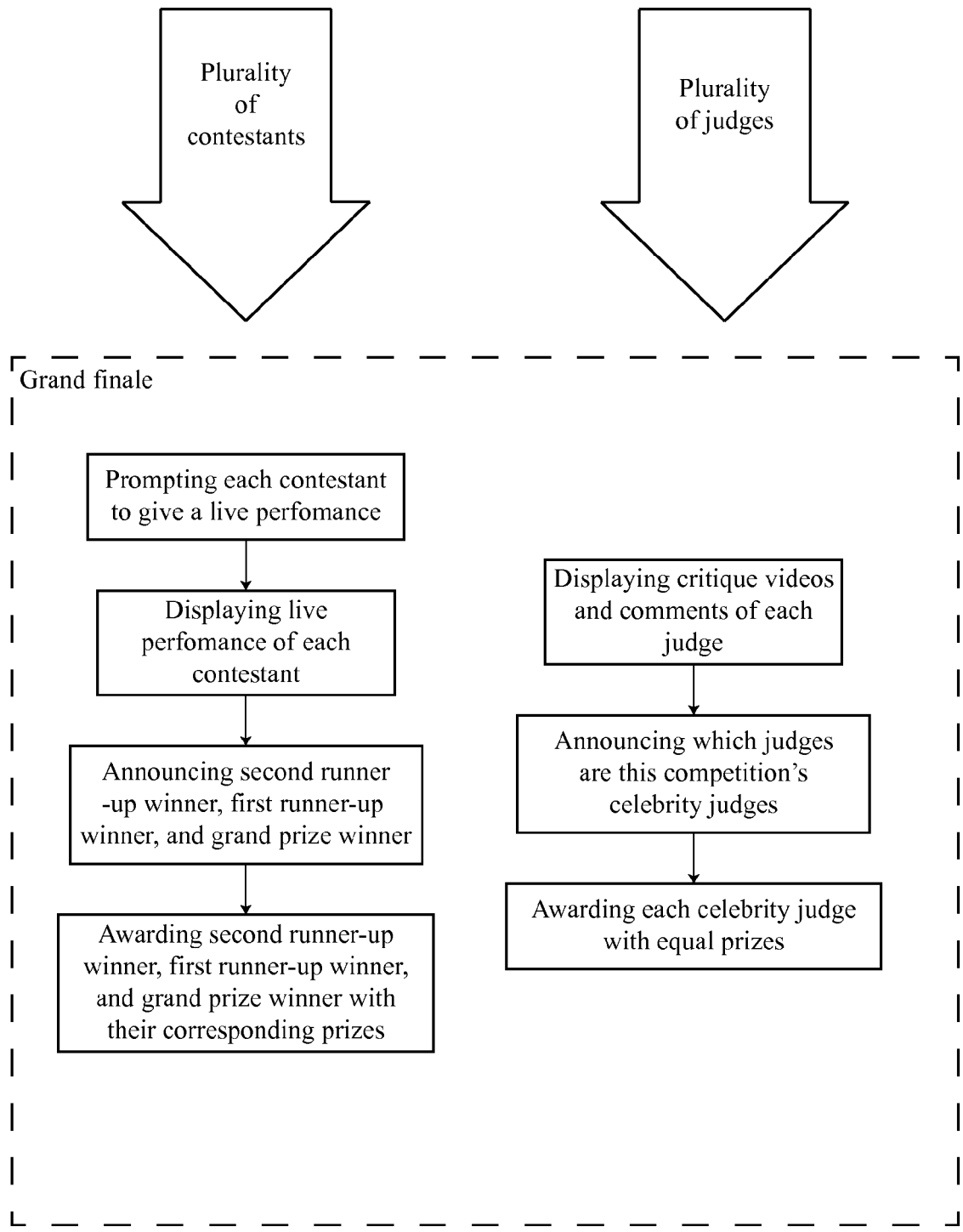
FIG. 10 is a generalized flow chart depicting the details of grand final for both the contestants and the judges.

Only contestants that are final level qualifiers and judges that are judge finalist to participate in the grand finale of the talent competition, which is shown in FIG. 10. Level-four of the talent competition is the same process for contestants in the music-and-song category and for contestants in the entertainment category. The grand finale is streamed through the website software so that the plurality of fans can view the grand finale from their Internet-enabled electronic devices. The grand finale continues by prompting each of the final level qualifiers to give a live performance, which is displayed to the plurality of fans through the website software. After the live performances of the final level qualifiers, the administrator announces the third place level-four qualifier as the second runner-up prize winner, the second place level-four qualifier as the first runner-up prize winner, and the first place level-four qualifier as the grand prize winner. The grand prize winner, the first runner-up winner, and the second runner-up winner are awarded with their corresponding final level prizes, which include a minimum $3000 prize for first place, a minimum $2000 prize for the first runner-up, and a minimum $1000 prize for the second runner-up. The grand finale continues by displaying the critique videos and comments of each judge finalists to the plurality of fans through the website software. The administrator then determines three celebrity judges from the judge finalists by weighing each of their overall commitment to the talent competition, each of their judging history, and each of their total number of best veteran judge votes. The three celebrity judges will be awarded equal celebrity judge prizes, which is a minimum $1000 prize for each of the three celebrity judges.

In the preferred embodiment of the present invention, the number of contestants reduces as the talent competition proceed through the series of levels. The talent competition begins by separating the plurality of contestants into the music-and-arts category and the entertainment category. For level-one, the talent competition reduces the number of contestants for the music-and-arts category to eighteen and the number of contestants for the entertainment category to eighteen, where three contestants emerge from each of the six level-one reiterations. For level-two, the talent competition reduces the number of contestants for the music-and-arts category to twelve and the number of contestants for the entertainment category to twelve, where two contestants emerge from each of the six level-one reiterations. For level three, the talent competition does not reduces the number of contestants for the music-and-arts category from twelve because the contestants automatically move on if they submit their studio production video. For level three, the talent competition also does not reduce the number of contestants for the entertainment category from twelve because the contestants automatically move on if they upload their interactive webpage. For level-four, the talent competition reduces the number of contestants for the music-and-arts category to six and the number of contestants for the entertainment category to six. For the grand finale, the talent competition reduces the number of contestants for the music-and-arts category to three and the number of contestants for the entertainment category to three, where the remaining three contestants are ranked as first place, second place, and third place winners.

Also in the preferred embodiment of the present invention, the number of judges reduces as the talent competition proceeds through the initial selection process, the intermediate selection process, and the grand finale. For the initial selection process, the talent competition reduces the number of judges to eighteen, where three judges emerge from each of the six times that the initial selection process is reiterated. For the intermediate selection process, the talent competition reduces the number of judges to six, which participate in the grand finale. For the grand finale, the talent competition reduces the number of contestants to three, where the remaining three contestants are given the title of celebrity judge.

Although the invention has been explained in relation to its preferred embodiment, it is to be understood that many other possible modifications and variations can be made without departing from the spirit and scope of the invention as hereinafter claimed.

What is claimed is:

1. A method of hosting and managing a talent competition through online, onstage, studio, and live performances comprises the steps of:
    providing a plurality of fans, a plurality of contestants, a plurality of judges, and a website software;
    providing a plurality of time constraints, wherein said plurality of time constraints includes a month long session and a six month period;
    prompting each of said plurality of contestants and each of said plurality of judges to create an online account on said website software;
    providing an Internet Protocol address (IP address) for each of said plurality of fans, wherein said Internet Protocol address allows each of said plurality of fans to access said website software;
    starting off said plurality of judges as novice judges;
    retrieving an introduction profile from each of said novice judges through said website software;
    executing a initial selection process for said novice judges through said website software;
    reiterating said initial selection process for said six month period;
    executing an intermediate selection process for veteran judges through said website software;
    prompting each of said plurality of contestants to choose either a music-and-song category or an entertainment category;
    grouping said plurality of contestants in said music-and-song category together in order to compete against each other;
    grouping said plurality of contestants in said entertainment category together in order to compete against each other;
    starting off said plurality of contestants as level-one qualifiers;
    retrieving an home performance video from each of said level-one qualifiers through said website software;
    executing level-one for said level-one qualifiers through said website software;
    reiterating said level-one for said six month period;
    retrieving an onstage performance video with an entry date from each of level-two qualifiers through said website software;
    executing level-two for said level-two qualifiers through said website software;
    reiterating said level-two after each reiteration of said level-one;
    executing level-three for level-three qualifiers through a local recording studio or a website designer;
    executing level-four for said level-four qualifiers through said website software;
    executing a grand finale for final level qualifiers and for said judge finalists; and
    streaming said grand finale through said website software to said plurality of fans.

2. The method of hosting and managing a talent competition through online, onstage, studio, and live performances as claimed in claim 1 comprises the steps of:
    displaying said introduction profile of each of said novice judges to said plurality of fans through said website software;
    retrieving best novice judge votes from each of said plurality of fans through said website software for said month long session, wherein said IP address for each of said plurality of fans is restricted from casting more than three votes per judge during said month long session and from casting more than one vote per judge during one day of said month long session;
    tallying a total number of best novice judge votes for each of said novice judges;
    determining a first place novice judge, a second place novice judge, a third place novice judge, and a runner-up novice judge from said total number of best novice judge votes for each of said novice judges;
    prompting said first place novice judge, said second place novice judge, and said third place novice judge to join said veteran judges;
    prompting said runner-up novice judge to join said veteran judges,
    if said first place novice judge, said third place novice judge, or said second place novice judge declines to join said veteran judges; and
    prompting each of said novice judges to replace said introduction profile with a new introduction profile.

3. The method of hosting and managing a talent competition through online, onstage, studio, and live performances as claimed in claim 1 comprises the steps of:
    creating a judge homepage for each of said veteran judges;
    retrieving critique videos and comments from each of said veteran judges, wherein said critique videos and said comments review performances by said plurality of contestants;
    displaying said critique videos and said comments on said judge homepage for each of said veteran judge through said website software;
    retrieving best veteran judge votes from each of said plurality of fans through said website software for said month long session, wherein said IP address for each of said plurality of fans is restricted from casting more than one vote per judge during one day of said month long session;
    tallying a total number of best veteran judge votes for each of said veteran judges;
    determining a first place veteran judge, a second place veteran judge, a third place veteran judge, a fourth place veteran judge, a fifth place veteran judge, a sixth place veteran judge, and a runner-up veteran judge from said total number of best veteran judge votes for each of said veteran judges;
    prompting said first place veteran judge, said second place veteran judge, said third place veteran judge, said fourth place veteran judge, said fifth place veteran judge, and said sixth place veteran judge to join said judge finalists;
    prompting said runner-up novice judge to join said veteran judges,
    if said first place veteran judge, said second place veteran judge, said third place veteran judge, said fourth place veteran judge, said fifth place veteran judge, and said sixth place veteran judge declines to join said judge finalists; and
    inviting said judge finalists to attend said grand finale event.

4. The method of hosting and managing a talent competition through online, onstage, studio, and live performances as claimed in claim 1 comprises the steps of:

determining if said home performance video is acceptable to view by said plurality of fans;

displaying said home performance video of each of said level-one qualifiers to said plurality of fans through said website software;

retrieving best level-one votes from each of said plurality of fans through said website software for said month long session, wherein said IP address for each of said plurality of fans is restricted from casting more than three votes per contestant during said month long session and from casting more than one vote per contestant in one day during said month long session;

tallying a total number of best level-one votes for each of said level-one qualifiers;

determining a first place level-one qualifier, a second place level-one qualifier, a third place level-one qualifier, and a runner-up level-one qualifier from said total number of best level-one votes for each of said level-one qualifiers;

awarding said first place level-one qualifier, said second place level-one qualifier, and said third place level-one qualifier with corresponding level-one prizes;

prompting said first place level-one qualifier, said second place level-one qualifier, and said third place level-one qualifier to join said level-two qualifiers;

prompting said runner-up level-one qualifier to join said level-two qualifiers, if said first place level-one qualifier, said second place level-one qualifier, or said third place level-one qualifier declines to join said level-two qualifiers; and prompting each of said level-one qualifiers to replace said home performance video with a new home performance video.

5. The method of hosting and managing a talent competition through online, onstage, studio, and live performances as claimed in claim 1 comprises the steps of:

determining if said onstage performance video is acceptable to view by said plurality of fans;

changing said level-two qualifiers with three earliest entry dates for said onstage performance video into active level-two qualifiers;

displaying said live performance video of each of said active level-two qualifiers to said plurality of fans through said website software;

retrieving best level-two votes from each of said plurality of fans through said website software for said month long session, wherein said IP address for each of said plurality of fans is restricted from casting more than one vote per contestant during one day of said month long session;

tallying a total number of best level-two votes for each of said active level-two qualifiers;

determining a first place level-two qualifier, a second place level-two qualifier, and a runner-up level-two qualifier from said total number of best level-two votes for each of said active level-two qualifiers;

awarding said first place level-two qualifier and said second place level-two qualifier with corresponding level-two prizes;

prompting said first place level-two qualifier and said second place level-two qualifier to join said level-three qualifiers; and prompting said runner-up level-two qualifier to join said level-three qualifiers, if said first place level-two qualifier or said second place level-two qualifier declines to join said level-three qualifiers.

6. The method of hosting and managing a talent competition through online, onstage, studio, and live performances as claimed in claim 1 comprises the steps of:

prompting each of said level-three qualifiers to accept a royalty share agreement;

inviting each of said level-three qualifiers to said local recording studio;

professionally recording a studio performance video for each of said level-three qualifiers at said local recording studio, if said level-three qualifiers chose said music-and-song category;

reviewing, editing, and finalizing said studio performance video with said local recording studio;

retrieving said studio performance video from each of said level-three qualifiers through said website software;

prompting said level-three qualifiers to join said level-four qualifiers;

determining if said studio performance video is acceptable to view by said plurality of fans; and displaying said studio performance video of each of said level-three qualifiers to said plurality of fans through said website software.

7. The method of hosting and managing a talent competition through online, onstage, studio, and live performances as claimed in claim 1 comprises the steps of:

professionally building an interactive website for each of said level-three qualifiers with a website designer, if said level-three qualifiers chose said entertainment category;

reviewing, editing, and finalizing said interactive website with said website designer;

posting said interactive website for each of said level-three qualifiers through said website software;

prompting said level-three qualifiers to join said level-four qualifiers;

determining if said interactive website is acceptable to be viewed by said plurality of fans; and displaying said interactive website of each of said level-three qualifiers to said plurality of fans through said website software.

8. The method of hosting and managing a talent competition through online, onstage, studio, and live performances as claimed in claim 1 comprises the steps of:

retrieving best level-four votes from each of said plurality of fans through said website software for said month long session, wherein said IP address for each of said plurality of fans is restricted from casting more than one vote per contestant during one day of said month long session;

tallying a total number of best level-four votes for each of said level-four qualifiers;

determining a first place level-four qualifier, a second place level-four qualifier, a third place level-four qualifier, a fourth place level-four qualifier, a fifth place level-four qualifier, a sixth place level-four qualifier, and a runner-up level-four qualifier from said total number of best level-four votes for each of said level-four qualifiers;

prompting said first place level-four qualifier, said second place level-four qualifier, said third place level-four qualifier, said fourth place level-four qualifier, said fifth place level-four qualifier, and said sixth place level-four qualifier to join said final level qualifiers;

prompting said runner-up level-four qualifier to join said final level qualifiers, if said first place level-four qualifier, said second place level-four qualifier, said third place level-four qualifier, said fourth place level-four qualifier, said fifth place level-four qualifier, or said sixth place level-four qualifier declines to join said final level qualifiers; and inviting said final level qualifiers to attend said grand finale event.

9. The method of hosting and managing a talent competition through online, onstage, studio, and live performances as claimed in claim 8 comprises the steps of:

prompting each of said final level qualifiers to give a live performance;

displaying said live performance of each of said final level qualifiers to said plurality of fans during said grand finale;

announcing said third place level-four qualifier as said second runner-up prize winner to said plurality of fans through said website software;

announcing said second place level-four qualifier as said first runner-up prize winner to said plurality of fans through said website software;

announcing said first place level-four qualifier as said grand prize winner to said plurality of fans through said website software; and awarding said grand prize winner, said first runner-up prize winner, and said second runner-up prize winner with corresponding final level prizes.

10. The method of hosting and managing a talent competition through online, onstage, studio, and live performances as claimed in claim 3 comprises the steps of:

displaying said critique videos and said comments of each of said judge finalists to said plurality of fans during said grand finale;

determining three celebrity judges from said judge finalists by weighing said total number of best veteran judge votes for each of said judge finalists, overall commitment by each of said judge finalists, and judging history for each of said judge finalists;

announcing said three celebrity judges during said grand finale; and awarding said three celebrity judges with said equal celebrity judge prizes.

\* \* \* \* \*